United States Patent
Lorenz

(10) Patent No.: US 11,440,637 B2
(45) Date of Patent: Sep. 13, 2022

(54) ACTUATION UNIT FOR ACTUATING A FOLDABLE WING TIP PORTION OF A WING FOR AN AIRCRAFT

(71) Applicant: Airbus Operations GmbH, Hamburg (DE)

(72) Inventor: Christian Lorenz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 883 days.

(21) Appl. No.: 16/270,938

(22) Filed: Feb. 8, 2019

(65) Prior Publication Data
US 2019/0248468 A1 Aug. 15, 2019

(30) Foreign Application Priority Data
Feb. 9, 2018 (DE) ...................... 10 2018 102 924.1

(51) Int. Cl.
| | |
|---|---|
| *B64C 3/56* | (2006.01) |
| *F16H 19/04* | (2006.01) |
| *F16H 19/06* | (2006.01) |
| *F16H 25/20* | (2006.01) |

(52) U.S. Cl.
CPC .............. *B64C 3/56* (2013.01); *F16H 19/04* (2013.01); *F16H 19/06* (2013.01); *F16H 25/20* (2013.01); *F16H 2025/2043* (2013.01)

(58) Field of Classification Search
CPC .. F16H 2025/2043; F16H 25/20; F16H 19/06; F16H 19/04; B64C 3/56
See application file for complete search history.

(56) References Cited

U.S. PATENT DOCUMENTS

| | | | |
|---|---|---|---|
| 3,272,458 A | 9/1966 | Bracka | |
| 4,041,795 A * | 8/1977 | Rekoff, Jr. | .............. F16H 25/20 74/89.27 |
| 4,778,129 A | 10/1988 | Byford | |
| 5,201,479 A | 4/1993 | Renzelmann | |
| 2010/0089029 A1* | 4/2010 | Somerfield | ............. F02K 1/763 74/89.23 |
| 2011/0036939 A1 | 2/2011 | Easter | |

(Continued)

FOREIGN PATENT DOCUMENTS

| | | |
|---|---|---|
| EP | 3 059 161 | 8/2016 |
| EP | 3 067 270 | 9/2016 |

(Continued)

OTHER PUBLICATIONS

European Search Report cited in EP 19155277.7 dated May 14, 2019, 9 pages.

(Continued)

*Primary Examiner* — David M Fenstermacher
(74) *Attorney, Agent, or Firm* — Nixon & Vanderhye P.C.

(57) ABSTRACT

An actuation unit (15) for actuating a foldable wing tip portion (9) of a wing (3) for an aircraft (1). The actuation unit (15) includes a track (25) configured to be mounted to a fixed wing (5), a carriage (27) configured to engage the track (25) for guided movement along the track (25), and configured to be coupled to a drive unit (31) for driving the carriage (27) along the track (25), and a link (29) configured to be coupled to the carriage (27) and configured to be coupled to a foldable wing tip portion (9).

17 Claims, 5 Drawing Sheets

(56) References Cited

U.S. PATENT DOCUMENTS

| | | | |
|---|---|---|---|
| 2011/0041632 A1* | 2/2011 | Baker | B64C 13/341 |
| | | | 74/89.21 |
| 2012/0080557 A1* | 4/2012 | Rodrigues | F16H 25/20 |
| | | | 244/99.3 |
| 2013/0327883 A1 | 12/2013 | Kordel et al. | |
| 2014/0117151 A1 | 5/2014 | Fox et al. | |
| 2015/0210377 A1* | 7/2015 | Good | B64C 3/56 |
| | | | 244/49 |
| 2017/0137110 A1 | 5/2017 | Harding et al. | |
| 2019/0291851 A1* | 9/2019 | Wagner | F16H 25/20 |
| 2020/0032741 A1* | 1/2020 | Werquin | F16H 25/2015 |
| 2020/0039630 A1* | 2/2020 | Kamila | B64C 23/065 |
| 2020/0103008 A1* | 4/2020 | Iuga | F16H 25/205 |
| 2020/0186005 A1* | 6/2020 | Borgarelli | B64C 13/505 |
| 2020/0369188 A1* | 11/2020 | Samain | B60N 2/885 |
| 2021/0062898 A1* | 3/2021 | Medina | F16H 25/20 |
| 2021/0122463 A1* | 4/2021 | Bernard | B64C 29/0033 |
| 2021/0190185 A1* | 6/2021 | Mezzino | F16H 25/2454 |
| 2021/0237856 A1* | 8/2021 | Pandian | B29C 70/347 |

FOREIGN PATENT DOCUMENTS

| | | |
|---|---|---|
| EP | 3 254 954 | 12/2017 |
| GB | 565 468 | 11/1944 |
| WO | 2015/162399 | 10/2015 |

OTHER PUBLICATIONS

Search Report cited in German Patent Application No. DE 10 2018 102 924.1 dated Nov. 12, 2018, 9 pages.

\* cited by examiner

ACTUATION UNIT FOR ACTUATING A FOLDABLE WING TIP PORTION OF A WING FOR AN AIRCRAFT

RELATED APPLICATION

This application claims priority to German Patent Application DE 10 2018 102 924.1 filed Feb. 9, 2018, the entirety of which is incorporated by reference.

BACKGROUND

The present invention relates to an actuation unit for actuating a foldable wing tip portion of a wing for an aircraft. Further aspects of the invention relate to a wing comprising the actuation unit as well as to an aircraft comprising the actuation unit or the wing.

Such a wing comprises a fixed wing and a foldable wing tip portion mounted to the fixed wing rotatably between a folded position, where the span of the aircraft is reduced, and an extended position, where the aircraft has its full span. Specifically, the foldable wing tip portion is foldable upwards about an axis extending in a horizontal plane and/or in parallel to a chord line and/or in parallel to the wing surface and/or in a flight direction of the aircraft. Alternatively, the foldable wing tip portion might also be foldable rearwards about an axis extending in a vertical direction and/or in a wing depth direction and/or in a direction transverse or perpendicular to the wing surface.

Foldable wings are developed in order to reduce the space requirements of an aircraft during maneuver and parking on ground. As soon as the aircraft has landed the wing tip portions of the wing are folded upwards or rearwards, thereby reducing the overall span of the aircraft.

Actuation units for actuating movable parts of the wing, such as slats, are known in the art. Such units commonly apply a rack and pinion drive. However, little available space at the wing tips and at the same time high torque requirements for the actuation of the wing tip portion do not allow to employ an actuation unit similar to the ones for moving slats or flaps of a known wing.

SUMMARY OF INVENTION

A highly compact and strong actuation unit has been invented and is disclosed herein.

The actuation unit includes a track, a carriage, and a link. The track may be straight or may be curved. The track is configured to be mounted, such as fixedly mounted, to a tip end of a fixed wing. The carriage engages or is configured to engage the track for guided translational movement of the carriage along the track. Further, the carriage is coupled to or configured to be coupled to a drive unit for driving the carriage along the track. The link may have an elongate shape and is coupled to or configured to be coupled to the carriage and configured to be coupled to a foldable wing tip portion. Such an actuation unit is particularly simple, compact and strong.

According to an embodiment, the track has a straight form and engages the carriage from opposite sides, so that the carriage is movable only linearly along the extension of the track. In such a way, a reliable movement path is formed. However, in other embodiments the track might also have a curved form.

The track may comprise two opposite track parts, for example formed as hollow, C-shaped profiles. The carriage is arranged between the track parts and comprises rollers engaging the track parts. The rollers may be mounted to the lateral sides of the carriage. In such a way, the carriage is effectively guided between the track parts.

Further, the link may comprise two spaced link elements that may be arranged on the lateral sides of the carriage. This serves for an advantageous and distributed load introduction in the foldable wing tip portion.

The link may be pivotally coupled to the carriage and may be configured to be pivotally coupled to a foldable wing tip portion. Such an arrangement avoids constraint forces.

According to another embodiment, the drive unit is formed as spindle drive. The spindle drive may comprise a spindle including a threaded outer circumference, an electric or hydraulic motor coupled to the spindle for driving the spindle in a rotating manner about its longitudinal axis, and a nut coupled to the carriage and engaging the spindle. Specifically, the nut has a bore with an internal thread engaging the external thread of the spindle. In such a way, upon rotation of the spindle the nut together with the carriage moves linearly along the spindle. The spindle and/or the motor are supported or configured to be supported at a fixed wing, e.g. are mounted to a fixed wing. The nut may be arranged between the two link elements. The spindle drive represents a reliable and effective drive unit.

In particular, the nut may be coupled to the carriage via a universal joint or a spherical joint. In such a way, the spindle does not need to proceed in parallel to the track, which might be the case when the track is inclined.

The motor may be coupled to the spindle via a universal joint or a spherical joint. This enables the spindle to be pivoted relative to the motor output even when the spindle is rotated, which might be necessary in cases where the spindle is nor parallel aligned with the track, e.g. when the track is inclined.

According to another embodiment, the drive unit is formed as a linear drive. The linear drive may comprise a stator part supported or configured to be supported at a fixed wing, and a movable drive rod having a first end received in the stator part and a second end coupled to the carriage, wherein the drive rod is axially movable relative to the stator part. The drive rod may be coupled to the carriage via a universal joint or a spherical joint. Different forms of the linear drive are appreciated. In particular, the linear drive may be formed as a hydraulic cylinder where the drive rod is moved relative to the stator part by the pressure of hydraulic fluid in the stator part. Alternatively, the linear drive may be formed as an electric linear motor where the drive rod is moved relative to the stator part by an electromagnetic force. Such linear drives represent further reliable and effective drive units.

According to a further embodiment, the drive unit is formed as a rack-and-pinion drive. The rack-and-pinion drive may comprise a toothed rack mounted to the carriage, a drive pinon engaging the rack for linearly moving the rack and the carriage along the track, and a motor for rotatingly driving the drive pinion. The toothed rack may be fixedly mounted to the carriage, such as formed at or coupled to the carriage. The drive pinion and/or the motor are supported or configured to be supported at a fixed wing, e.g. mounted to a fixed wing. Such a rack-and-pinion drive represents another reliable and effective drive unit.

According to a further embodiment, the drive unit is formed as a chain drive. The chain drive comprises a chain coupled to the carriage, a drive wheel engaging the chain for linearly moving the chain and the carriage, and a motor for rotatingly driving the drive wheel. The drive wheel and/or the motor are supported or configured to be supported at a fixed wing, e.g. mounted to a fixed wing. Instead of a chain drive the drive unit might be formed as a belt drive which is formed as the chain drive but where the chain is substituted by a belt. Such a chain drive represents another reliable and effective drive unit.

A further aspect of the present invention relates to a wing for an aircraft. The wing comprises a fixed wing, a foldable wing tip portion mounted to the fixed wing via hinges rotatable about a hinge axis, and an actuation unit according to any of the embodiment described above. The hinge axis might extend in a horizontal plane and/or in parallel to a chord line and/or in parallel to a wing surface and/or in a flight direction, so that the foldable wing tip portion can be folded upwards. Alternatively, the hinge axis might extend in a vertical direction and/or in a wing depth direction and/or in a direction transverse or perpendicular to the wing surface, so that the foldable wing tip portion can be folded rearwards. The track may be fixedly mounted to a tip end of the fixed wing. The drive unit is mounted to the fixed wing and is coupled to the carriage for moving the carriage along the track. The link is coupled to the foldable wing tip portion in a position spaced apart from the hinge axis in a direction opposite to the direction in which the foldable wing tip portion is moved to a folded position, so that the link pushes the foldable wing tip portion when it is moved to the folded position and pulls the foldable wing tip portion when it is moved to an extended position. For example, in case of a horizontal hinge axis, the foldable wing tip portion is moved to a folded position in an upward direction, so that the link is coupled to the foldable wing tip portion in a position spaced apart from the hinge axis in a downward direction, and in case of a vertical hinge axis, the foldable wing tip portion is moved to a folded position in a rearward direction, so that the link is coupled to the foldable wing tip portion in a position spaced apart from the hinge axis in a forward direction. Features and advantages mentioned further above in connection with the actuation unit also apply for the wing.

According to another embodiment, the track is mounted to the fixed wing such that it is inclined or skewed in a direction opposite to the direction in which the foldable wing tip portion is moved to a folded position. The track proceeds from its first end near the drive unit to its opposite second end in an inclined or skewed manner, wherein the track is inclined or skewed to a direction opposite to the direction in which the foldable wing tip portion is moved to a folded position. For example, in case of a horizontal hinge axis, the foldable wing tip portion is moved to a folded position in an upward direction, so that the track, when viewed from the first end to the second end, is inclined in a downward direction, and in case of a vertical hinge axis, the foldable wing tip portion is moved to a folded position in a rearward direction, so that the track, when viewed from the first end to the second end, is inclined in a forward direction. By such inclination of the track an acute angle is formed between the track and the inner side of the foldable wing tip, which relates to an advantageous kinematics that reduces the required forces applied by the drive unit and, thus, allows to downsize the drive unit.

A further aspect of the present invention relates to an aircraft comprising the actuation unit according to any of the embodiments described above or comprising the wing according to any of the embodiments described above. Features and advantages mentioned further above in connection with the actuation unit and the wing also apply for the aircraft.

SUMMARY OF DRAWINGS

Embodiments of the invention are illustrated in the attached drawings that include.

DETAILED DESCRIPTION

Figure 1:
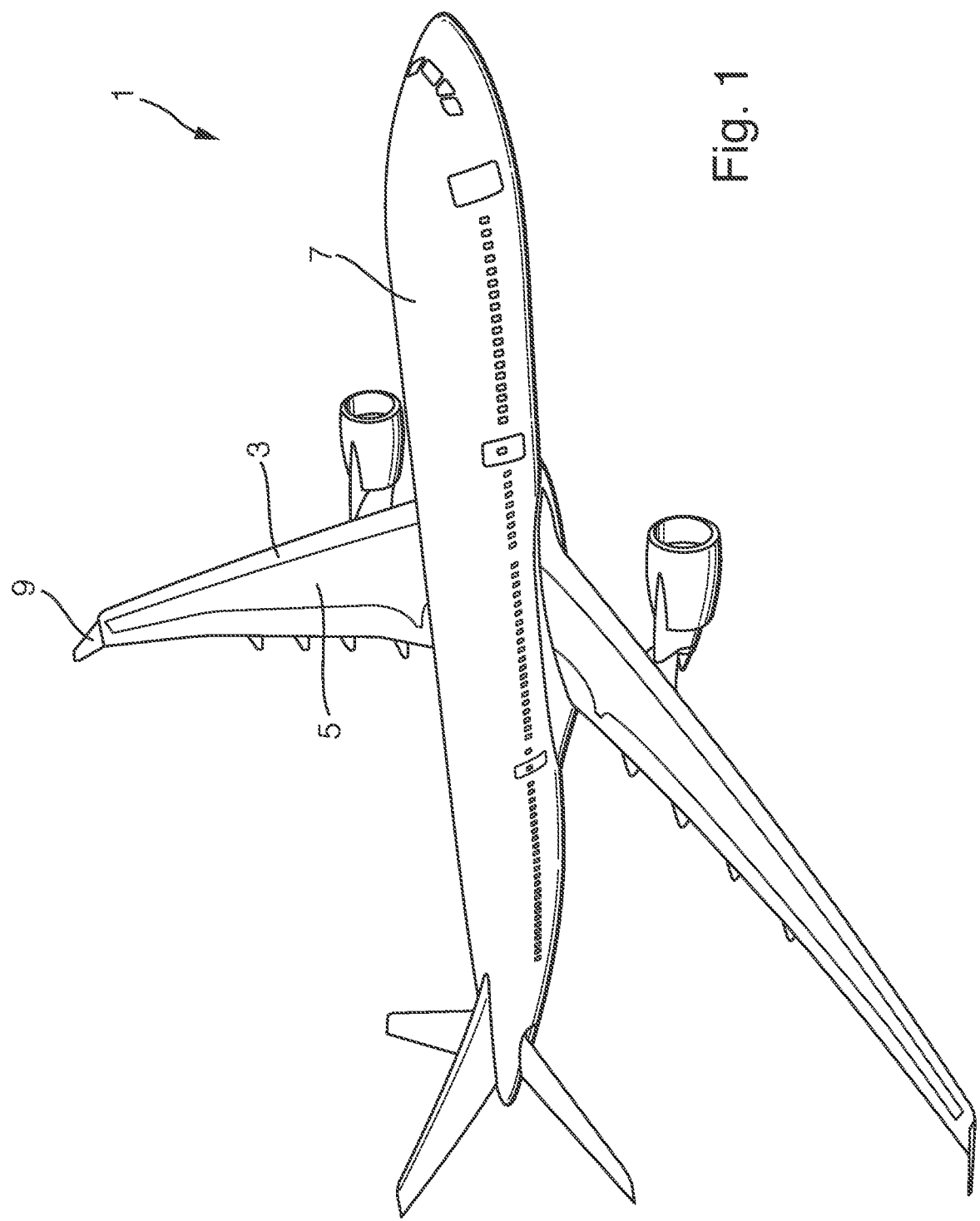
FIG. 1 is a perspective view of an aircraft according to an embodiment of the invention.

FIG. 1 shows an exemplary aircraft 1 according to an embodiment of the present invention. The aircraft 1 comprises a foldable wing 3 including a fixed wing 5 mounted to a fuselage 7, and a foldable wing tip portion 9 movably mounted to the fixed wing 5.

Figure 2:
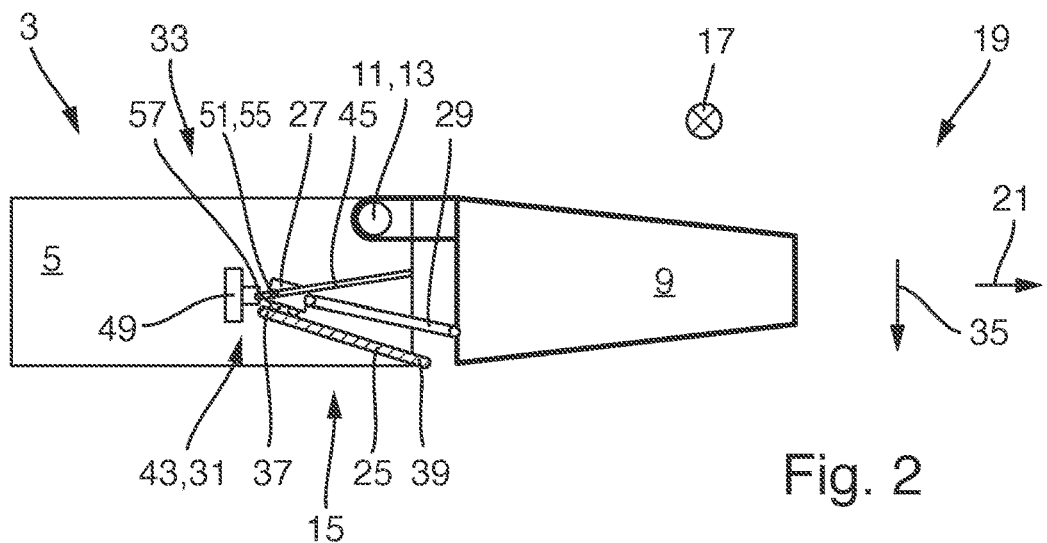
FIG. 2 is a schematic illustration of a wing of the aircraft shown in FIG. 1 with a drive unit formed as a spindle drive and a foldable wing tip portion in an extended position.
Figure 3:
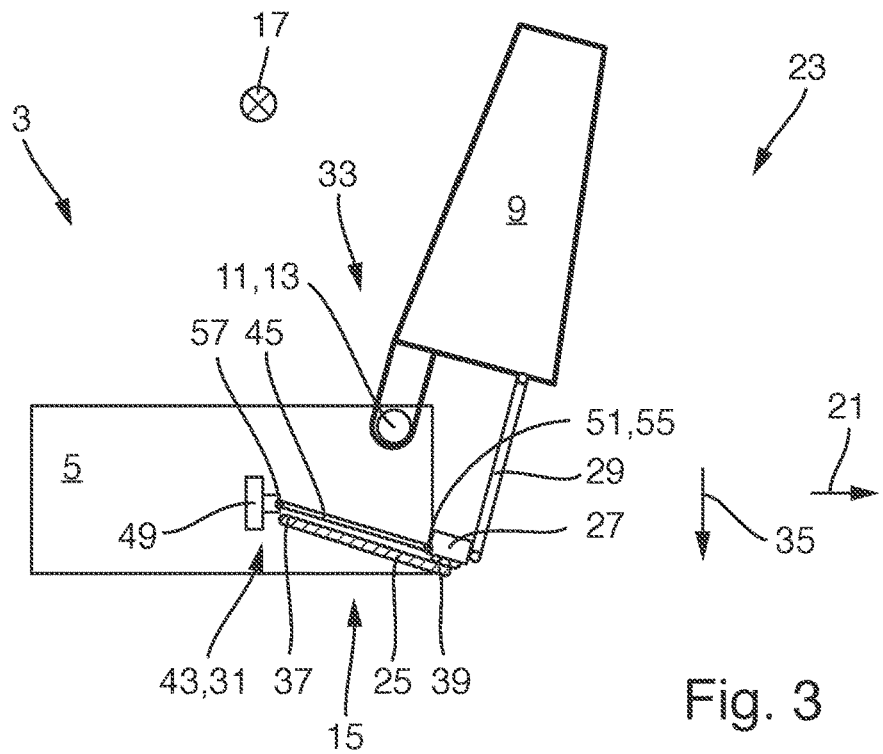
FIG. 3 is the wing of FIG. 2 with the foldable wing tip portion in an upwards folded position.
Figure 5:
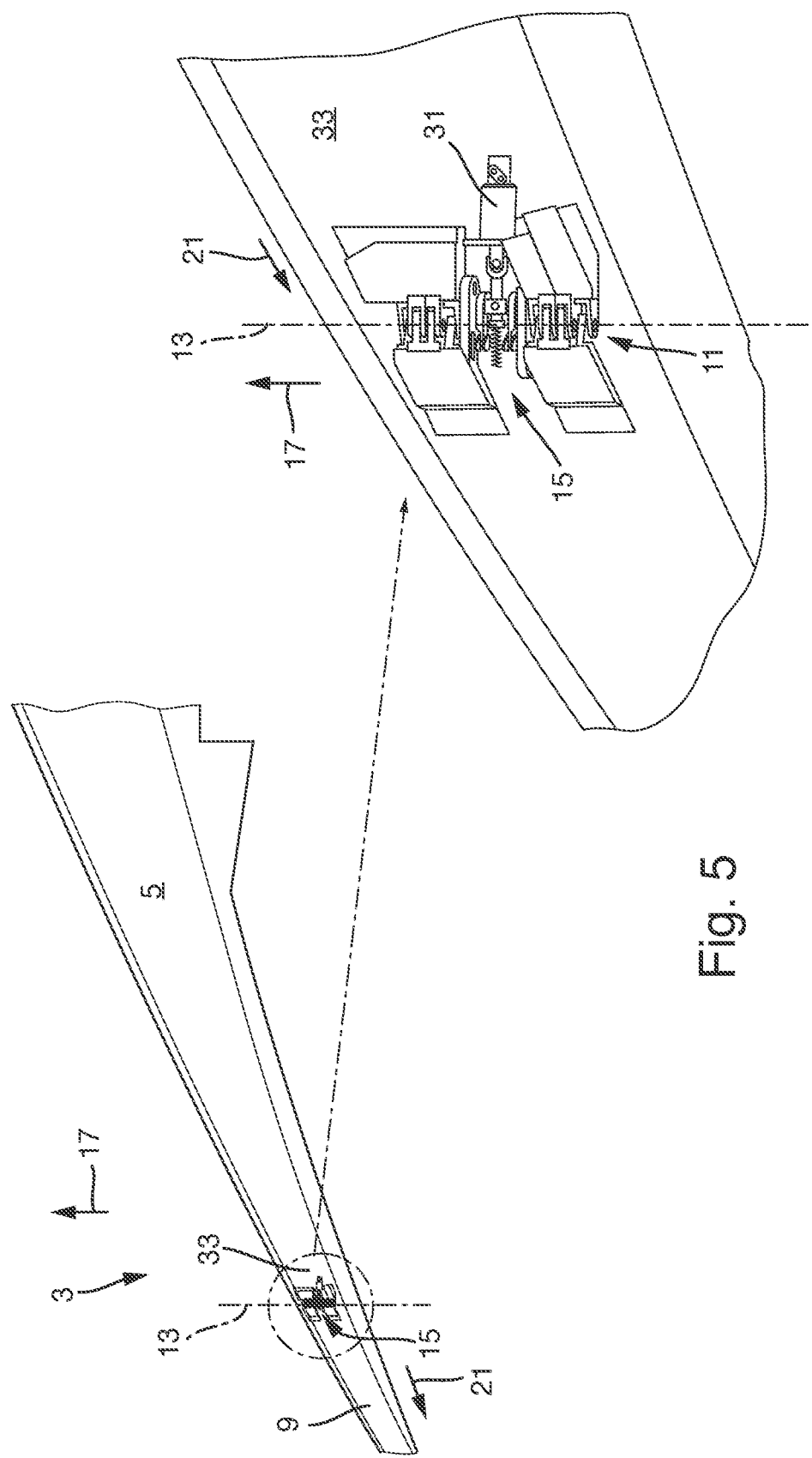
FIG. 5 is a top view of the wing of the aircraft of FIG. 1 with a detailed view of the actuation unit.

As shown in FIGS. 2, 3 and 5, the wing 3 comprises a fixed wing 5, a foldable wing tip portion 9 mounted to the fixed wing 5 via hinges 11 rotatable about a hinge axis 13, and an actuation unit 15 for actuating the foldable wing tip portion 9 as described further below and as shown in more detail in FIGS. 6 and 7. The hinge axis 13 in the present embodiment extends in the direction of a chord line and in the direction of flight 17 of the aircraft 1, so that the foldable wing tip portion 9 can be folded upwards. The foldable wing tip portion 9 can be moved between an extended position 19 in which it forms an extension of the fixed wing 5 in a span direction 21, and a folded position 23 in which it is pivoted upwards to reduce the span of the wing 3.

The actuation unit 15 comprises a track 25, a carriage 27, a link 29, and a drive unit 31. The track 25 has a straight form and is fixedly mounted to a tip end 33 of the fixed wing 5. The carriage 27 engages the track 25 for guided movement of the carriage 27 along the track 25. Further, the carriage 27 is coupled to the drive unit 31 for driving the carriage 27 along the track 25. The link 29 is pivotally coupled to the carriage 27 and is pivotally coupled to the foldable wing tip portion 9. The track 25 is mounted to the fixed wing 5 in such a way that it is inclined in a downward direction 35 when viewed from its first end 37 near the drive unit 31 to its opposite second end 39.

Figure 6:
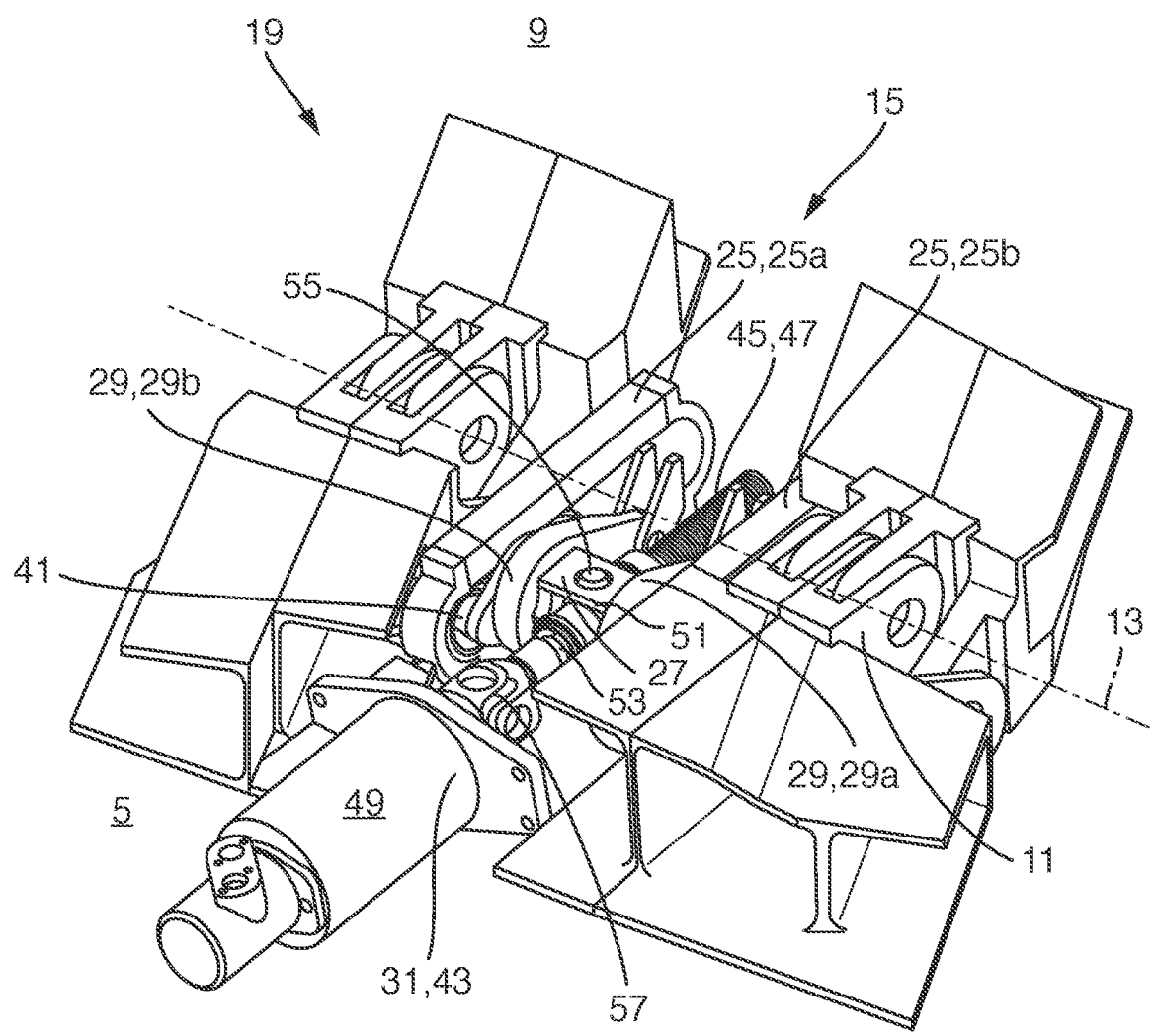
FIG. 6 is a perspective isolated view of the actuation unit of FIG. 5 with the link in a setting for an extended position of the foldable wing tip portion.
Figure 7:
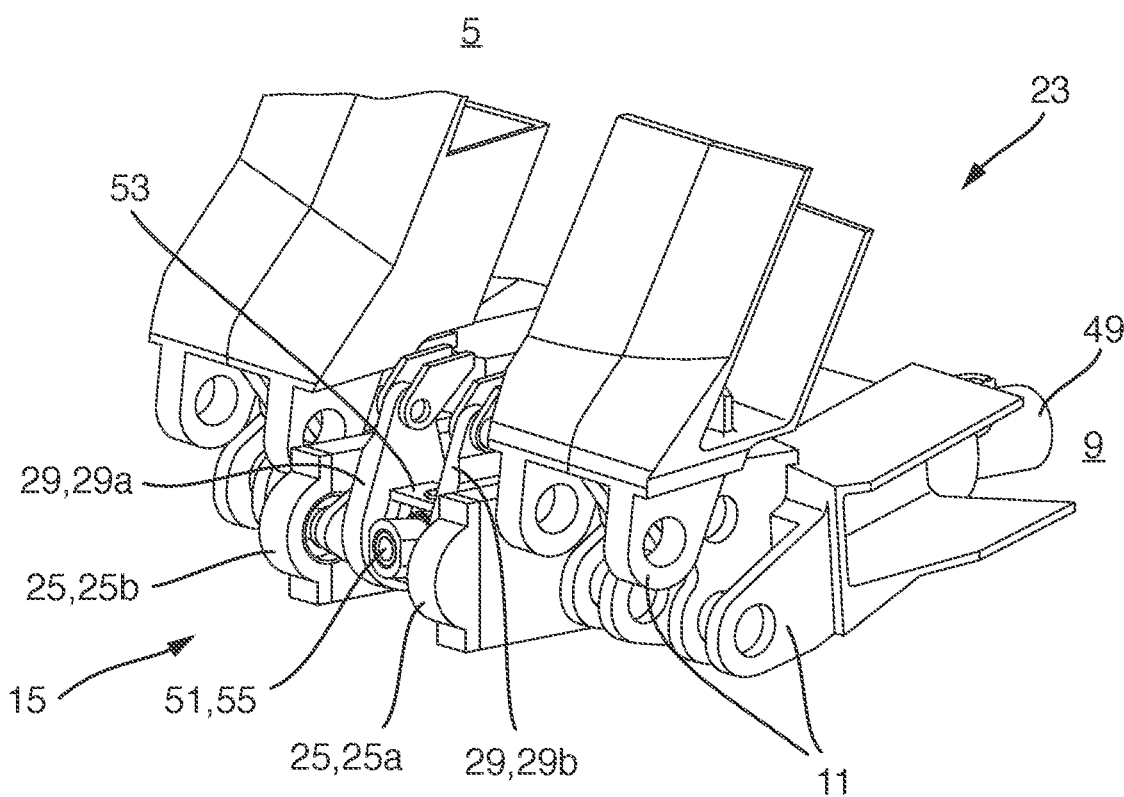
FIG. 7 is a perspective isolated view of the actuation unit of FIG. 5 with the link in a setting for a folded position of the foldable wing tip portion.

As shown in FIGS. 6 and 7, the track 25 engages the carriage 27 from opposite sides, so that the carriage 27 is movable only linearly along the extension of the track 25. The track 25 comprises two opposite track parts 25a, 25b formed as hollow, C-shaped profiles. The carriage 27 is arranged between the track parts 25a, 25b and comprises rollers 41 mounted to the lateral sides of the carriage 27 and engaging the track parts 25a, 25b. The link 29 comprises two spaced link elements 29a, 29b that are arranged on the lateral sides of the carriage 27. The link 29 is coupled to the foldable wing tip portion 9 in a position spaced apart from the hinge axis 13 in the downward direction 35, so that the link 29 pushes the foldable wing tip portion 9 upwards when it is moved to the folded position 23 and pulls the foldable wing tip portion 9 when it is moved to the extended position 19.

The drive unit 31 is mounted to the fixed wing 5 and is coupled to the carriage 27 for moving the carriage 27 along the track 25. In the present embodiment shown in FIGS. 2, 3 and 5-7, the drive unit 31 is formed as spindle drive 43. The spindle drive 43 comprises a spindle 45 including a threaded outer circumference 47, an electric motor 49 coupled to the spindle 45 for driving the spindle 45 in a rotating manner about its longitudinal axis, and a nut 51 coupled to the carriage 27 and engaging the spindle 45. The nut 51 has a bore 53 with an internal thread engaging the external thread of the spindle 45. Upon rotation of the spindle 45 the nut 51 together with the carriage 27 moves linearly along the spindle 45. The motor 49 is mounted to a fixed wing 5. The nut 51 is coupled to the carriage 27 via a first universal joint 55 that is arranged between the two link elements 29a, 29b. Further, the motor 49 is coupled to the spindle 45 via a second universal joint 57.

Figure 4:
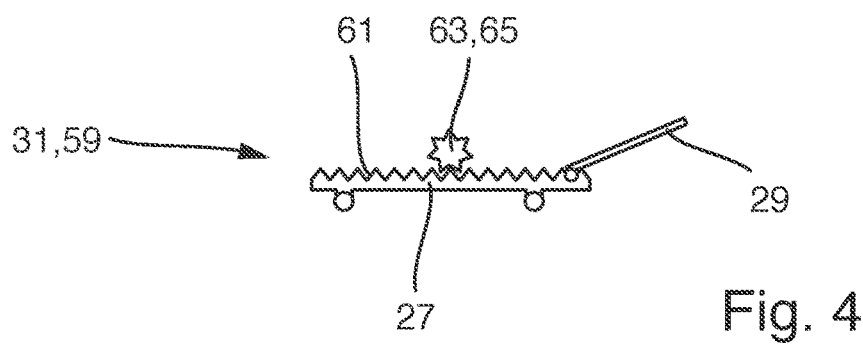
FIG. 4 is a schematic illustration of an alternative embodiment of the drive unit that is formed as a rack-and-pinion drive.

As an alternative to the spindle drive 43, the drive unit 31 might also be formed as a rack-and-pinion drive 59, as shown in FIG. 4. The rack-and-pinion drive 59 comprises a toothed rack 61 fixedly mounted to the carriage 27, a drive pinon 63 engaging the rack 61 for linearly moving the rack 61 and the carriage 27 along the track 25, and a motor 65 for rotatably driving the drive pinion 63. The drive pinion 63 and the motor 65 are mounted to the fixed wing 5.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An actuation unit for actuating a foldable wing tip portion to pivot about a hinge axis of a hinge connecting the foldable wing tip portion to a fixed wing portion of a wing for an aircraft, the actuation unit comprising:
   a track configured to be mounted to the fixed wing portion;
   a carriage configured to engage the track for guided movement along the track, and configured to be coupled to a drive unit configured to drive the carriage along the track, and
   a link configured to be coupled to the carriage and configured to be coupled to the foldable wing tip portion,
   wherein the link is offset from the hinge in a direction perpendicular to the hinge axis such that an axis of the link does not extend through the hinge.

2. The actuation unit according to claim 1, wherein the track has a straight form and engages the carriage from opposite sides so that the carriage is movable only linearly along the extension of the track.

3. The actuation unit according to claim 1, wherein the track comprises two opposite track parts, wherein the carriage is arranged between the track parts and comprises rollers engaging the track parts.

4. The actuation unit according to claim 1, wherein the link is pivotally coupled to the carriage and is configured to be pivotally coupled to a foldable wing tip portion.

5. The actuation unit according to claim 1, wherein the drive unit is formed as spindle drive comprising
   a spindle,
   a motor coupled to the spindle and configured to drive the spindle in a rotating manner, and
   a nut coupled to the carriage and configured to engage the spindle, so that upon rotation of the spindle the nut together with the carriage moves linearly along the spindle,
   wherein the spindle and/or the motor are configured to be supported at a fixed wing.

6. The actuation unit according to claim 5, wherein the nut is coupled to the carriage via a first universal joint or spherical joint.

7. The actuation unit according to claim 5, wherein the motor is coupled to the spindle via a second universal joint or spherical joint.

8. The actuation unit according to claim 1, wherein the drive unit is formed as a linear drive comprising
   a stator part configured to be supported at a fixed wing, and
   a movable drive rod having a first end received in the stator part and a second end coupled to the carriage, wherein the drive rod is axially movable relative to the stator part.

9. The actuation unit according to claim 8, wherein the drive rod is coupled to the carriage via a universal joint or a spherical joint.

10. The actuation unit according to claim 8, wherein the linear drive is formed as a hydraulic cylinder or as an electric linear motor.

11. The actuation unit according to claim 1, wherein the drive unit is formed as a rack-and-pinion drive comprising
   a toothed rack mounted to the carriage,
   a drive pinon engaging the rack configured to linearly move the rack and the carriage, and
   a motor configured to rotatably drive the drive pinion,
   wherein the drive pinion and/or the motor are configured to be supported at a fixed wing.

12. The actuation unit according to claim 1, wherein the drive unit is formed as a chain drive comprising
   a chain coupled to the carriage,
   a drive wheel engaging the chain for linearly moving the chain and the carriage, and
   a motor configured to rotatably drive the drive wheel,
   wherein the drive wheel and/or the motor are configured to be supported at a fixed wing.

13. A wing for an aircraft comprising
   a fixed wing portion,
   a foldable wing tip portion mounted to the fixed wing portion via hinges rotatable about a hinge axis, and
   an actuation unit including:
   a track mounted to the fixed wing portion;
   a carriage engaging the track to move along the track,
   a drive unit mounted to the fixed wing portion and configured to drive the carriage along the track, and
   a link coupled to the carriage and to the foldable wing tip portion at a position spaced apart from the hinge axis in a direction opposite to the direction in which the foldable wing tip portion is moved to the folded position.

14. The wing according to claim 13, wherein the track is mounted to the fixed wing such that it is inclined in a direction opposite to the direction in which the foldable wing tip portion is moved to the folded position.

15. A wing of an aircraft, the wing comprising
- a fixed wing including a root attached to a fuselage of the aircraft and an end opposite to the root;
- a foldable wing tip mounted to the end of the fixed wing via hinges rotatable about a hinge axis, and
- an actuation unit including:
- a track mounted to the fixed wing;
- a carriage configured to engage the track and move along the track;
- a drive unit mounted to the fixed wing and configured drive the carriage along the track, and
- a link coupled to the carriage and to the foldable wing tip such that movement of the link and carriage moves the foldable wing tip between an extended position and an folded position, wherein a coupling between the link and the foldable wing tip is spaced apart from the hinges, and the carriage and link move along a direction perpendicular to the hinge axis.

16. The wing of claim 15, wherein the track includes a straight path for the carriage that does not intersect the hinge axis, and the carriage is configured to move along the straight path.

17. The wing of claim 15, wherein the link is an arm having a first end connected to the carriage and a second arm connected to the foldable wing tip.

* * * * *